(12) United States Patent
Moreno et al.

(10) Patent No.: US 6,811,135 B2
(45) Date of Patent: Nov. 2, 2004

(54) SOLENOID OPERATED SLEEVE VALVE

(75) Inventors: Jorge A. Moreno, Auburn Hills, MI (US); Gregory J. Capoccia, Casco, MI (US); Anthony G. Koenings, Oakland, MI (US)

(73) Assignee: Eaton Corporation, Cleveland, OH (US)

( * ) Notice: Subject to any disclaimer, the term of this patent is extended or adjusted under 35 U.S.C. 154(b) by 201 days.

(21) Appl. No.: 10/279,432

(22) Filed: Oct. 24, 2002

(65) Prior Publication Data

US 2004/0079912 A1 Apr. 29, 2004

(51) Int. Cl.⁷ .............................................. F16K 31/06
(52) U.S. Cl. ............................. 251/129.02; 251/129.21
(58) Field of Search ....................... 251/129.01, 129.02, 251/129.08, 129.15, 129.2, 129.21, 117, 343, 344

(56) References Cited

U.S. PATENT DOCUMENTS

| 4,437,645 | A | * | 3/1984 | Nomura et al. ................ 251/65 |
| 4,512,546 | A | * | 4/1985 | Inada et al. .................... 251/65 |
| 4,655,249 | A | * | 4/1987 | Livet ........................ 137/625.5 |
| 4,696,379 | A | * | 9/1987 | Yamamoto et al. ....... 188/282.3 |
| 5,011,113 | A | * | 4/1991 | Stobbs et al. .......... 251/129.16 |
| 5,419,369 | A |   | 5/1995 | House et al. .......... 137/625.65 |
| 5,897,098 | A | * | 4/1999 | Nishinosono et al. .. 251/129.08 |
| 6,199,823 | B1 |  | 3/2001 | Dahlgren et al. ........... 251/117 |
| 6,588,726 | B2 | * | 7/2003 | Osterhart et al. ...... 251/129.02 |

FOREIGN PATENT DOCUMENTS

| EP | 1 239 200 | 9/2002 |
| EP | 1 275 874 | 1/2003 |

* cited by examiner

Primary Examiner—J. Casimer Jacyna
(74) Attorney, Agent, or Firm—Roger A. Joanston

(57) ABSTRACT

A load bearing valve body has an annular collector groove supplied by radial ports connected to an inlet in the end of the valve body. An annular sleeve type armature has a plurality of arcuate slots located thereon to axially valve the collector groove upon solenoid energization.

17 Claims, 6 Drawing Sheets ic # SOLENOID OPERATED SLEEVE VALVE

BACKGROUND OF THE INVENTION

The present invention relates to solenoid operated valves and particularly valves of the type intended for installation in a system requiring the valve to be subjected to tensile or compressive loading and as such to serve as a structural member in the system. Examples of such installation may be found in McPherson struts and shock absorbers employed in motor vehicle road wheel suspensions and particularly suspensions of the type where the stiffness or dynamic response of the suspension is varied during running by an electronic controller.

In particular, it has been desired to provide an electrically operated valve for controlling the flow of hydraulic fluid in a suspension shock absorber for a motor vehicle where the fluid flow is required to be bi-directional by virtue of the extension and compression movement of the shock absorber. More particularly, it is desired to have electronic control of the rate of flow of the fluid through the dampening orifice in the shock absorber in order to vary and control the amount or rate of dampening provided to the suspension by the shock absorber.

Heretofore, in such electrically controlled variable rate shock absorbers, it has been the practice to install the control valve in the central rod or piston of the shock absorber in order to minimize the size of the shock absorber and facilitate its installation in the suspension. This requirement has necessitated that the control valve be mounted as a load bearing member and the shock absorber piston rod; and, this has created problems in designing the valve for the desired valving function.

One known arrangement for a shock absorber control valve is that illustrated in FIG. 8 wherein the valve body 1 has the opposite ends thereof configured for connecting to load bearing members as with an annular armature sleeve 2 slidably received thereover with radial ports 3 providing flow from the inlet in the end of the body to a collector groove 4 which is supplied by a row of radial ports 3 formed in the body 1; and, the collector groove is valved by radial ports 5 in the armature sleeve 2. In the known valve construction of FIG. 8, problems have been encountered wherein the sudden step created by axial movement of the armature sleeve causing the ports 5 to communicate with the edge of the collector groove 4 has resulted in a static pressure buildup when the flow is flowing from the outside of the armature to the inside by flow stagnation pressure forces which tend to move the armature further to the closed position irrespective of the magnetic flux generated on the armature by the coil 6. When flow is reversed from the inside of the armature to the outside, the static pressure buildup in the collector groove and the ports tends to create pressure forces which also act to push the armature to the closed position.

In the known valve design of FIG. 8, upon flow in the direction from the body inlet through the transverse ports 3 and outwardly through the ports 5 in the armature sleeve, when the sleeve has partially closed the ports 3, results in flow impinging on the sides of the ports 5 in the armature sleeve 2 and causes an axial component of the reaction of the fluid flow against the side of the port and tends to move the armature sleeve toward a closed position until the sides of the ports 5 are no longer impinged upon by the flow through the ports 3. This results in an automatic partial closing of the valve without energization of the solenoid coil.

Attempts have been made to overcome this problem by increasing the stiffness of the return spring 7 and have resulted in a prohibitive amount of current flow or power consumption of the coil. This is particularly troublesome where it is required that the coil have a minimum resistance to minimize the power consumption from the on-board vehicle power supply which typically operates at a relatively low direct current voltage.

Thus it has long been desired to provide a way or means of eliminating unwanted flow pressure induced movement of the armature sleeve in a solenoid operated valve of the type wherein the valve body is a structural member and to provide such a valve which is reliable and low in manufacturing cost.

BRIEF SUMMARY OF THE INVENTION

The present invention provides a solenoid operated valve of the type wherein the valve body is intended to be a load bearing structural member in a system in which the valve is installed and which employs an annular sleeve slidable on the valve body for valving radial ports in the body. The valving ports in the sleeve are configured as arcuate slots to minimize the effect of pressure forces from the flow in the radial ports impinging on the sides of the sleeve ports to cause biasing or automatic movement of the sleeve independent of the solenoid energization. The arcuate slots comprise about seventy percent of the circumference of the sleeve and have an axial width of about forty percent of the diameter of the radial ports in the valve body.

DETAILED DESCRIPTION OF THE INVENTION

Figure 1:
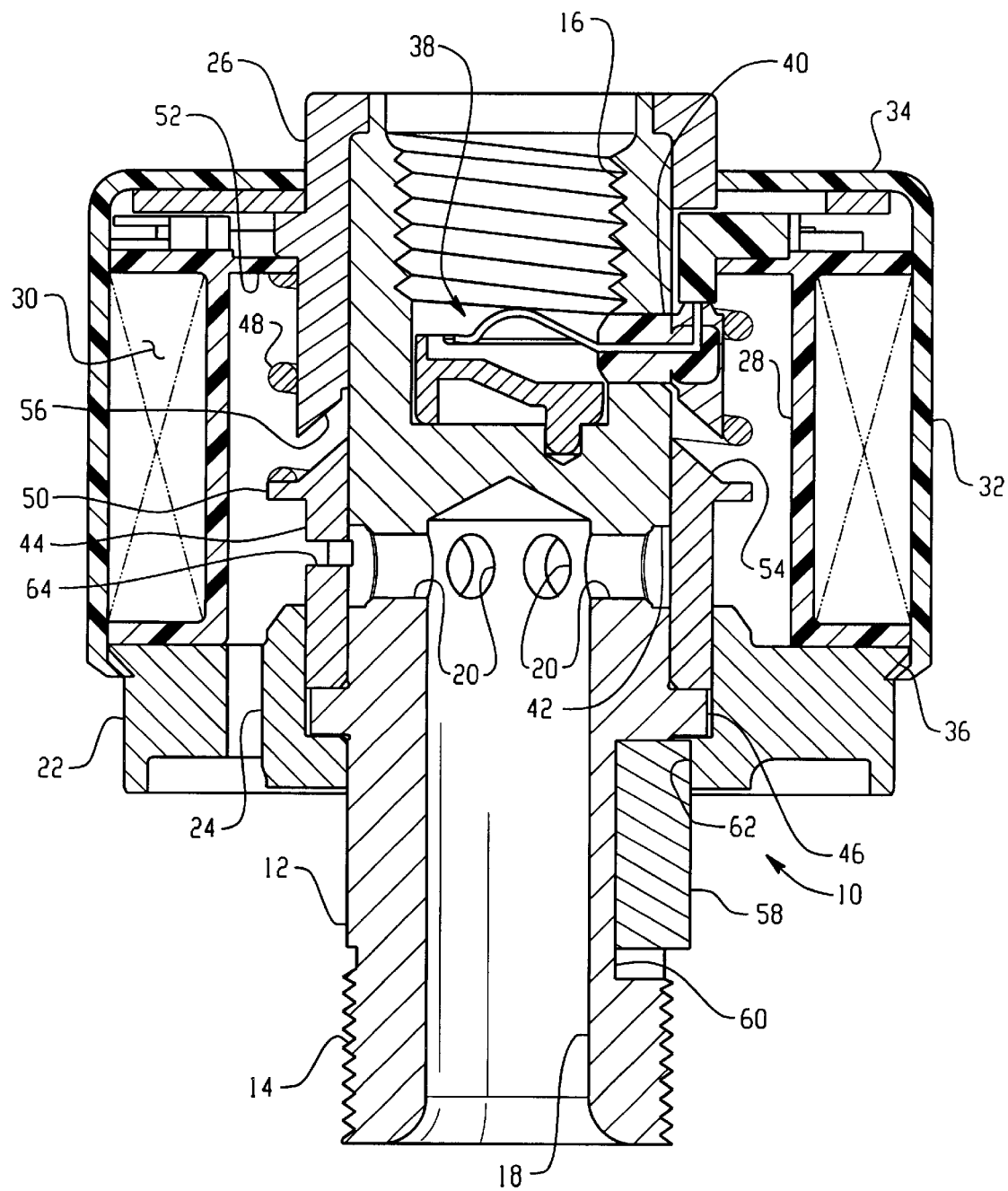
FIG. 1 is a cross-sectional view of the valve of the present invention in the de-energized state.

Referring to FIGS. 1 through 6, the valve of the present invention is indicated generally at 10 and includes a valve body 12 preferably having a generally cylindrical configuration with external threads 14 and internal threads 16 at opposite ends thereof for attachment thereto in a system wherein the attachments are intended to apply tensile or compressive loads to the valve body as a structural load bearing member of the system. Such an installation may be found where the valve is employed to control or vary the hydraulic fluid flow rate in the suspension shock absorber in a motor vehicle.

The lower end of body 12 has a fluid pressure inlet passage or bore 18 formed therein which communicates with a plurality of radially oriented or cross-ports 20 disposed in circumferentially spaced arrangement about the bore 18. The body 12 has a flux collector ring 22 disposed thereon which has an exhaust port 24 formed therein and extending preferably axially therethrough. The body 12 also has an upper pole piece in the form of annular member 26 disposed over the body with a coil bobbin 28 received therebetween with a coil 30 wound thereon. Coil 30 is covered by a suitable housing or casing 32 which has a radially inwardly extending flange 34 provided on the upper end thereof for retaining the pole piece 26 on the body; and, the lower end of the casing 32 is secured on a flange 36 formed on the flux collector 22, preferably by deforming such as by staking or crimping.

A switch 38 is disposed in the bore of the internal thread 16 which switch is connected to the coil via terminals 40. The switch in a typical shock absorber application is adapted to be actuated by an actuator member (not shown) forming part of the structural system to which the valve is assembled such as the piston rod of a shock absorber.

The cross ports 20 in body 12 communicate with an annular collector groove 42 formed in the body and which has slidably received thereover in closely fitting arrangement, an annular armature or sleeve 44 which is biased downwardly against an annular flange 46 formed on the body 12 by a suitable spring 48 received over the pole piece 26 with the lower end thereof registered against an annular flange 50 formed on the armature 44 with the upper end of the spring 48 registered against bobbin flange 52.

The upper end of the armature sleeve 44 has an annular tapered portion 54 provided thereon; and, the lower end of the pole piece 26 has a correspondingly configured annular chamfer 56 formed thereon which surfaces 54, 56 define an annular axial air gap between the upper end of armature 44 and the lower end of pole piece 26.

In the presently preferred practice, a key 58 is provided in a slot 60 formed in the body; and, the key 58 extends outwardly from slot 60 and also engages a corresponding slot 62 formed in the flux collector 22 for rotationally aligning the exhaust port 24 with the key 58 which also intended to engage portions of the structure (not shown) into which the valve is assembled.

Referring particularly to FIGS. 3 through 6, the annular armature or sleeve 44 has a plurality of arcuately extending slots 64 disposed in circumferentially, preferably equally spaced, arrangement about the armature.

Slots 64 are located axially on armature 44 with respect to the lower end of the armature such that when the armature is in the "Off" or coiled de-energized condition as shown in FIG. 1, with the lower end of the armature registered against flange 46, the slot 64 will fully communicate with collector groove 42 and the cross ports 20 rendering the valve in the fully open condition.

Figure 2:
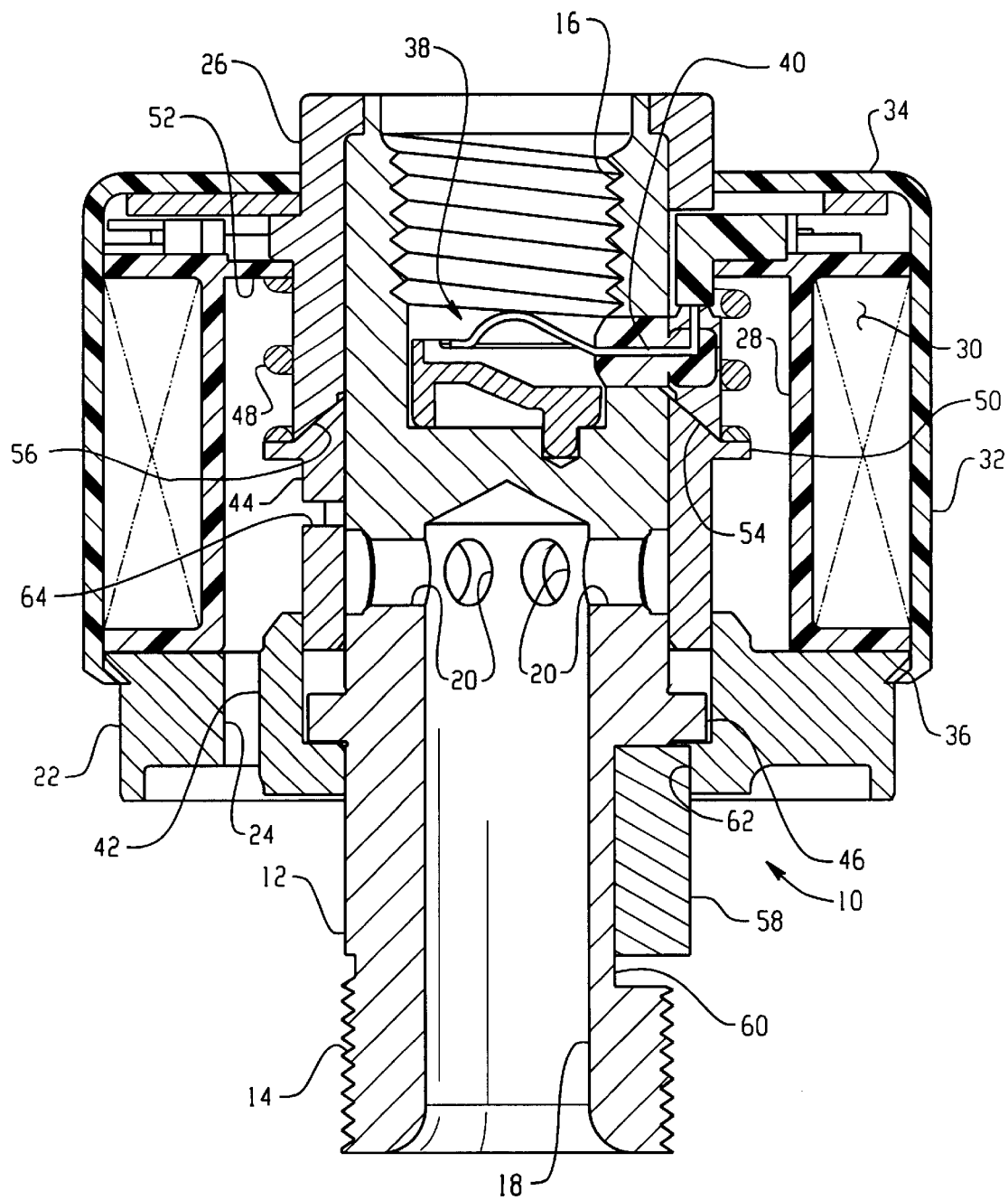
FIG. 2 is a view similar to FIG. 1 of the valve of the present invention with the solenoid energized and the valve in the closed condition.
Figure 3:
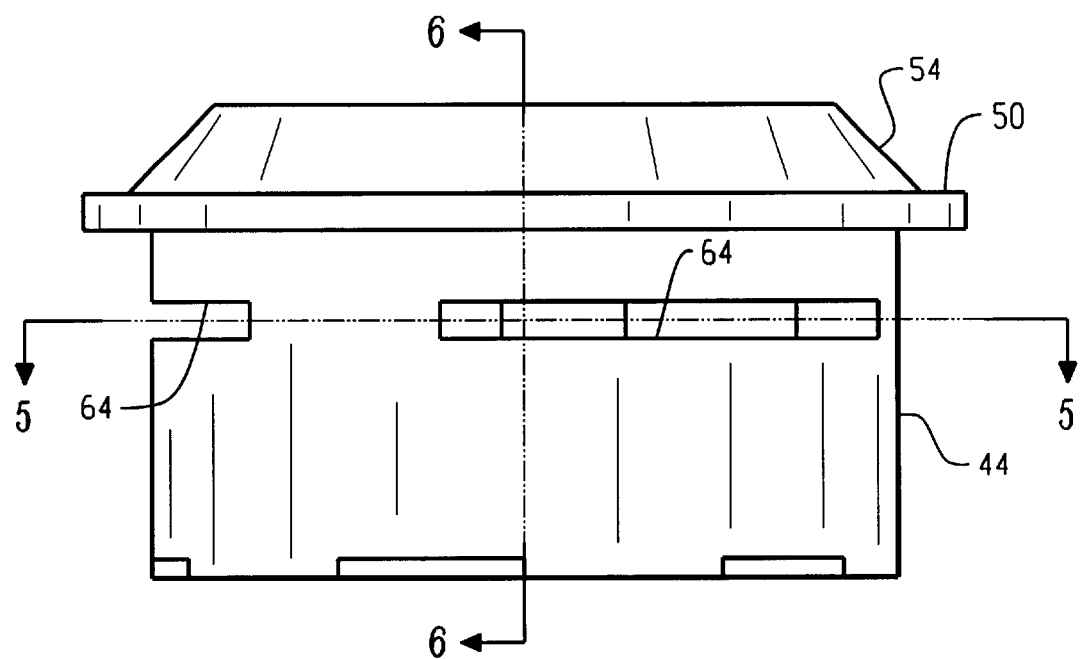
FIG. 3 is a side elevation view of the armature sleeve of the valve of FIG. 1.
Figure 4:
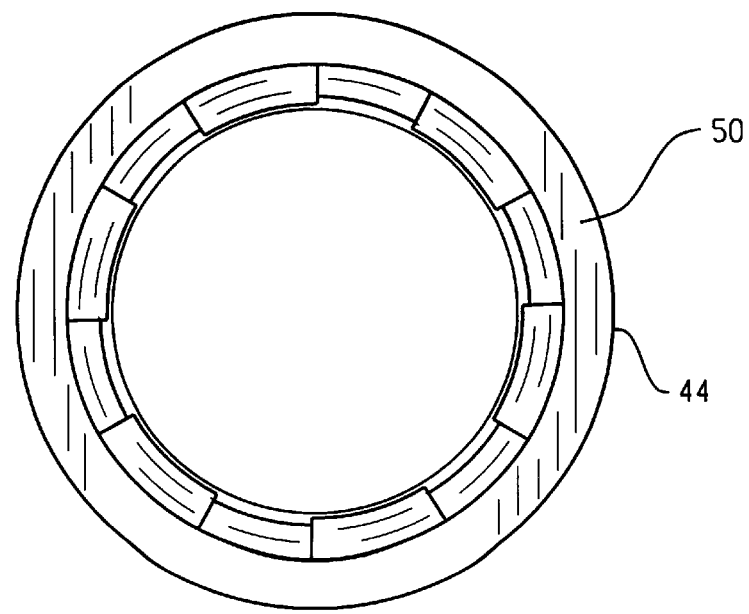
FIG. 4 is a bottom view of the armature sleeve of FIG. 3.
Figure 5:
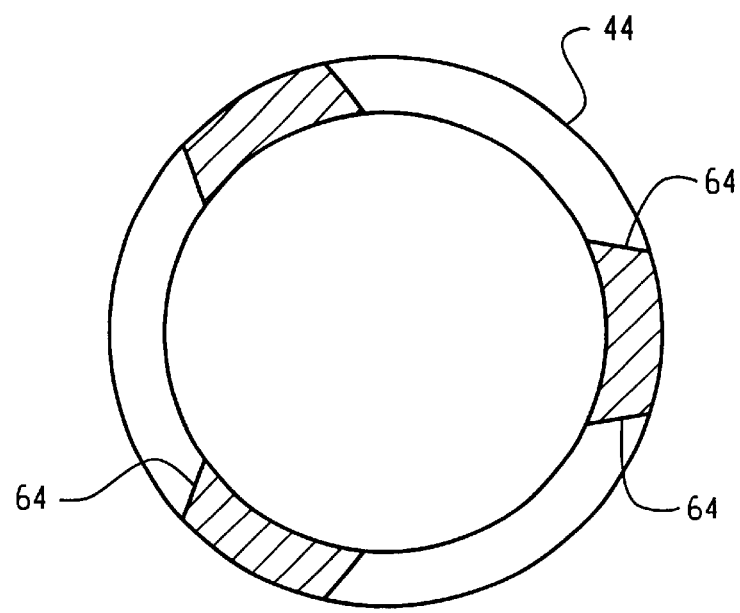
FIG. 5 is a section view taken along section indicating lines 5—5 of FIG. 3.
Figure 6:
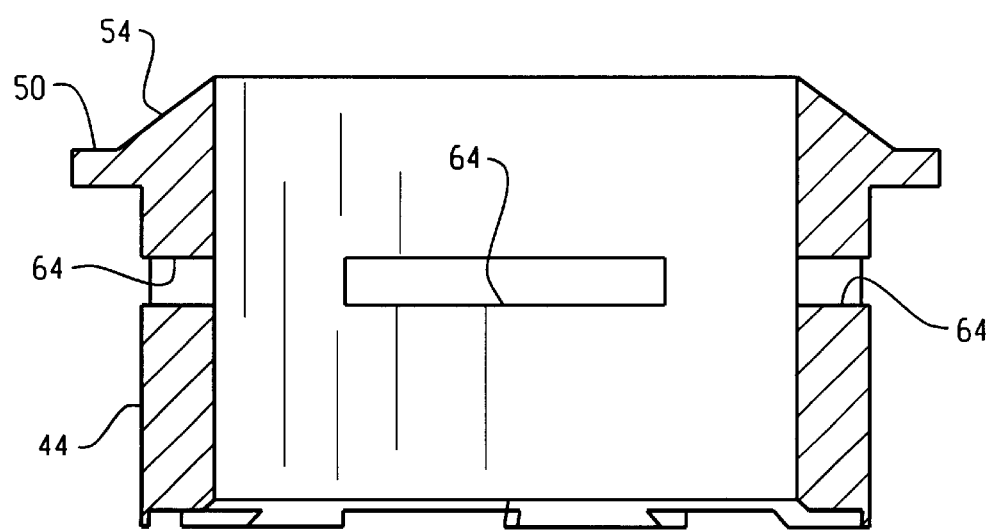
FIG. 6 is a section view taken along section indicating lines 6—6 of FIG. 3.
Figure 7:
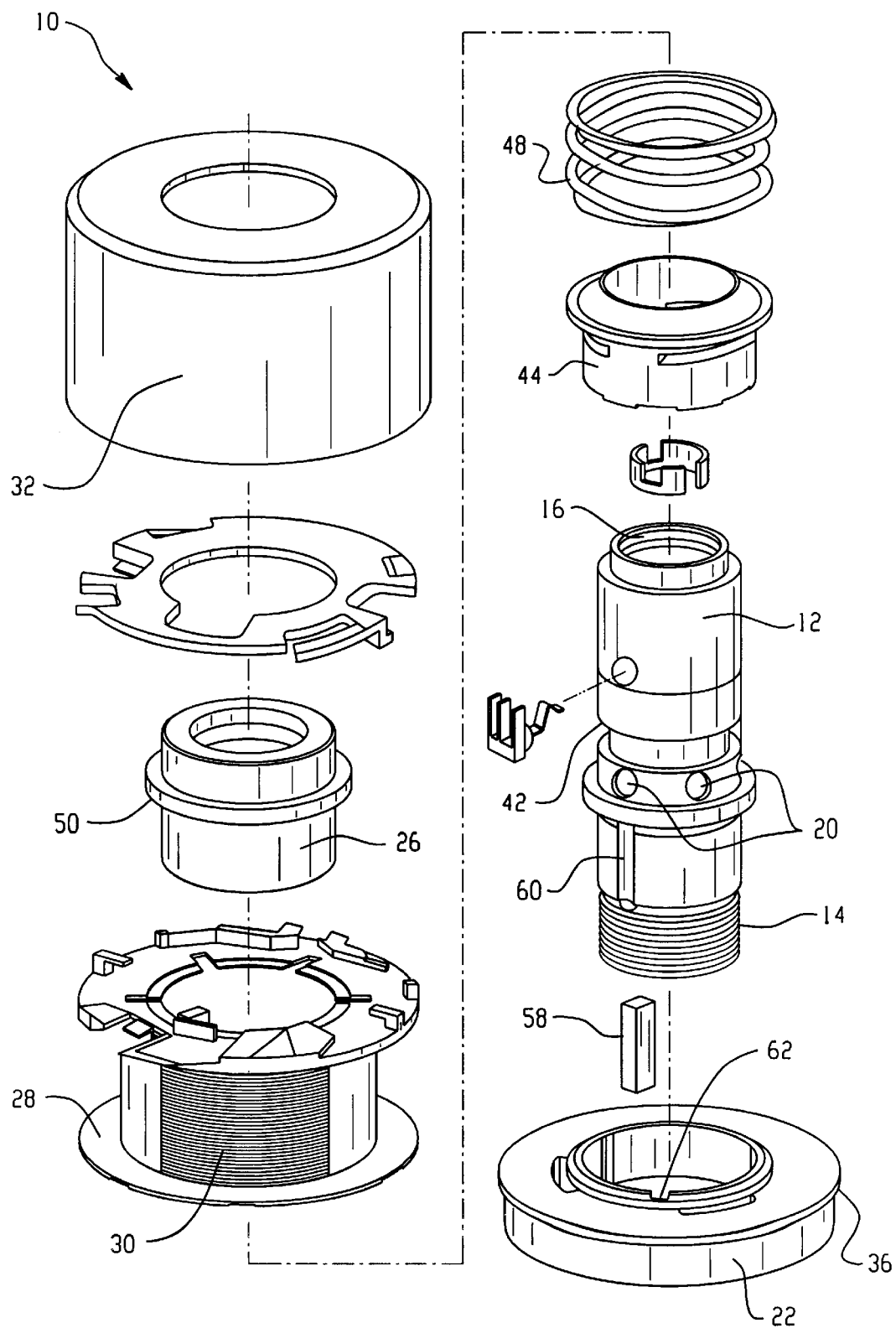
FIG. 7 is an exploded view of the valve of FIG. 1.
Figure 8:
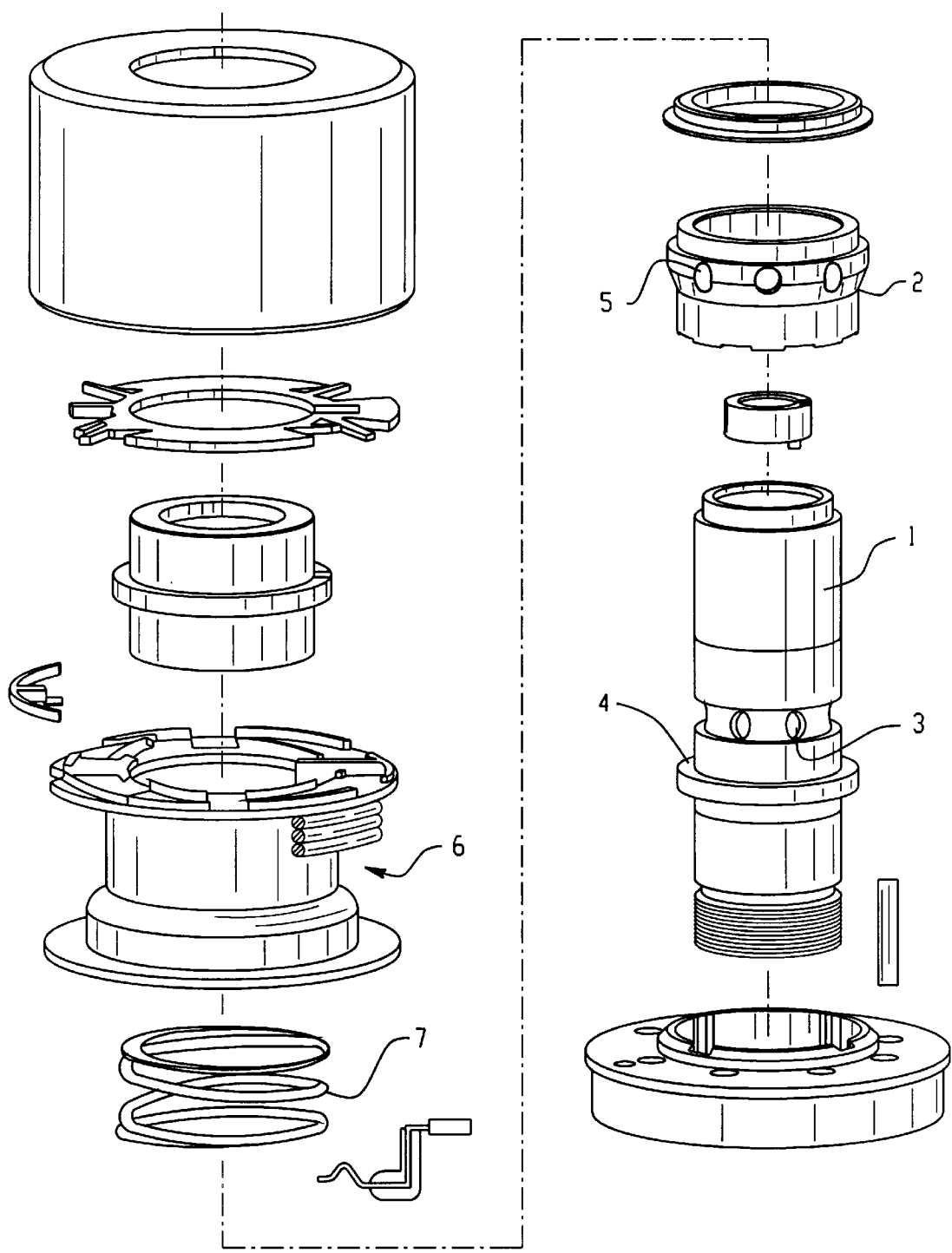
FIG. 8 is an exploded view of a prior art valve.

Referring to FIG. 2, the valve is shown with the coil energized and the armature attracted to the pole piece 26 closing the air gap between surfaces 54 and 56. It will be apparent from FIG. 2 that in the fully energized condition the arcuate slots 64 are located axially on the armature 44 such that the slots 64 have moved upwardly to a position in which the slots 64 do not communicate with the collector groove 42 thereby closing off flow through ports 20.

In the present practice of the invention, the arcuate slots 64 have an axial width of about 1.25 mm and comprise in the aggregate an arcuate circumferential extension of about 70% of the circumference.

The present invention thus provides a simple and easy to manufacture and relatively low cost solenoid operated valve wherein the body of the valve is intended to be a load bearing structural member of the system into which the valve is installed; and, the valve of the present invention has particular application in automotive shock absorbers or struts. The valve of the present invention utilizes an annular sleeve as the armature with arcuate slots formed therein for valving annular collector groove supplied by radial ports in the valve body as the armature is moved axially by varying the current in the solenoid coil provided thereon.

Although the invention has hereinabove been described with respect to the illustrated embodiments, it will be understood that the invention is capable of modification and variation and is limited only by the following claims.

What is claimed is:

1. A normally open solenoid operated valve assembly comprising:
   (a) a body having an end with an inlet port formed therein and a plurality of transverse valving ports disposed on surfaces distal said one end in peripherally spaced arrangement and communicating with the inlet port;
   (b) an annular armature disposed over said valving ports in closely fitting sliding arrangement;
   (c) a coil disposed about said armature; and,
   (d) an annular flux collector disposed adjacent one end of said armature and forming a working air gap therebetween, wherein said annular armature has a plurality of elongated arcuately extending slots therein for valving said outlet ports.

2. The valve assembly defined in claim 1, wherein said armature includes an annular flange with one end of a return spring registered thereagainst.

3. The valve assembly defined in claim 1, wherein said armature is moveable axially between a position with said slots opening said valving ports and a position closing said valving ports.

4. The valve assembly defined in claim 1, wherein said armature includes three arcuately spaced slots disposed in circumferentially equally spaced arrangement.

5. The valve assembly defined in claim 1, wherein said body has a generally cylindrical configuration with said inlet port communicating with a central bore and said valving ports disposed in circumferentially equally spaced arrangement.

6. The valve assembly defined in claim 1, wherein each of said slots extends about twenty-three percent (23%) of the circumference of said armature.

7. The valve assembly defined in claim 1, wherein said plurality of slots has an aggregate arcuate extension of about seventy percent (70%) of the circumference.

8. The valve assembly defined in claim 1, wherein said armature has one end thereof castellated.

9. The valve assembly defined in claim 1, wherein said armature has one end thereof tapered for forming said working air gap.

10. The valve assembly defined in claim 1, wherein said arcuate slots have a length of about fifteen times the width thereof.

11. The valve assembly defined in claim 1, wherein said armature has an outer diameter of about 20 mm and said slots have a width of about 1.25 mm.

12. A method of a normally open solenoid operated valve assembly comprising:
   (a) forming an inlet port in one end of a valve body and forming therein a plurality of transverse valving ports in peripherally spaced arrangement and communicating with said inlet port;
   (b) disposing an annular armature for sliding movement on the body and forming a plurality of arcuately extending slots in the armature and locating said slots for effecting valving of the valving ports upon said sliding movement thereof;
   (c) disposing an annular flux collector adjacent said armature and forming a working air gap with respect thereto; and,
   (d) disposing a coil over said armature for effecting armature movement upon coil energization.

13. The method defined in claim 12, wherein said step of forming a plurality of valving ports includes forming said ports at a common station with respect to the direction of armature movement.

14. The method defined in claim 12, wherein said step of forming a plurality of arcuately extending slots includes forming three (3) circumferentially spaced slots.

15. The method defined in claim 12, wherein said step of forming a plurality of arcuately extending slots includes forming a plurality of circumferentially equally spaced slots.

16. The method defined in claim 12, wherein said step of disposing a coil includes disposing a coil over said armature and said flux collector.

17. The method defined in claim 12, wherein said step of forming a working air gap includes forming an annular axial air gap.

* * * * *